3,014,201
DIVIDED VISUAL DIRECTION INDICATOR FOR MOTOR VEHICLES FOR AN INDEPENDENT INDICATION IN FRONT AND AT THE REAR
Viktor Himmelbauer, 7 Josefsgasse, Vienna, Austria
Filed Aug. 28, 1958, Ser. No. 757,877
Claims priority, application Austria Aug. 29, 1957
2 Claims. (Cl. 340—81)

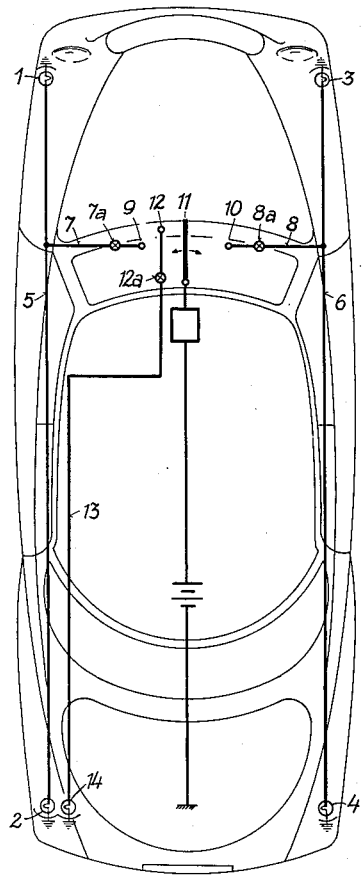

This invention relates to direction indicators for motor vehicles.

It is an object of the invention to provide for indicating turns to oncoming traffic.

It is a further object of the invention to provide for the selective and independent indicating of turns to oncoming and trailing traffic respectively.

Still another object of the invention is to provide improved means for avoiding accidents and facilitating the flow of traffic.

Briefly, to achieve the above and other of its objectives, the invention contemplates the provision of front and rear indicating means on an automotive vehicle and of control means for selectively operating said indicating means whereby the front indicating means can be operated independently of the rear indicating means.

Other objects, as well as advantages and features of the invention, will be apparent from the following detailed description of a preferred embodiment. In the accompanying drawing, the sole figure diagrammatically illustrates an automotive vehicle provided with indicators according to the invention.

In accordance with the invention a vehicle is provided with a front left-hand blinker 1, a rear left-hand blinker 2, a front right-hand blinker 3, and a rear right-hand blinker 4.

Blinkers 1 and 2 are connected by a cable 5, whereas blinkers 3 and 4 are connected by a cable 6. All of said blinkers are grounded so as to complete the electrical circuit hereinafter indicated.

Cable 5 is connected via a line 7 to a pilot light 7a. Cable 6 is connected via a line 8 to a pilot light 8a. Pilot lights 7a and 8a are respectively connected to contacts 9 and 10.

The apparatus of the invention has been provided with a control switch 11. This control switch is adpated to make contact not only with contacts 9 and 10, but further with, for example, an additional contact 12 provided in accordance with the invention.

Contact 12 is connected via a pilot light 12a and a line 13 with a supplementary blinker 14 positioned at the rear left-hand end of the vehicle. This supplemental blinker is employed as indicated with greater particularity hereinafter.

Control 11 is connected to a battery 15 or the like which constitutes the source of power which enables the blinkers to be lighted. It is to be noted that battery 15 is grounded as are blinkers 1—4, so that a complete electrical circuit is provided through the metal chassis of the vehicle.

In all cases both left-hand blinkers must be energized when turning to the left, for example, in countries with right-hand traffic.

When possible, with respect to oncoming traffic approaching in the opposite direction on the left side of the vehicle, the two left-hand blinkers are energized and the motor vehicle turns to the left.

When the traffic approaching in the opposite direction on the left does not permit turning to the left for the time being, the motor vehicle must halt at the crossing.

If its driver energizes the two left-hand blinkers while halting, he will hinder the traffic approaching in the opposite direction on the left side.

If the driver of the halted motor vehicle does not energize the left-hand blinkers until he actually turns to the left, in order to permit of an unhindered flow of the traffic approaching in the opposite direction on the left, he will run the risk that a vehicle coming up from behind may collide with him.

When the vehicle is compelled to halt due to oncoming traffic, the driver proceeding according to the invention will keep the rear direction indicator on the left energized and will deenergize the front left-hand blinker for the time being or, according to the example shown in the drawing, he will deenergize both left-hand blinkers while energizing by means of a separate cable another rear blinker.

More particularly, the switch 11 may be connected with either of contacts 9 or 10, so that either blinkers 1 and 2 or blinkers 3 and 4 respectively, are lighted. When the operator wishes to light blinker 14 alone, control 11 is positioned on contact 12. As a result a circuit is completed from ground through battery 15 via control 11, contact 12, pilot light 12a and line 13 through blinker 14 to ground. The operator, therefore, achieves the result of lighting blinker 14 alone. He thus achieves the objectives of the invention.

Although a specific embodiment of the invention has been herein described and illustrated, it will be appreciated that many modifications and variations of the invention are possible within the scope of the invention as defined by the following claims.

What is claimed is:

1. Indicator apparatus for a vehicle comprising a voltage source, front turn indicating means on the front of said vehicle, rear turn indicating means on the rear of said vehicle, and control means including circuits selectively coupling said source to said indicating means and providing selectively for the illumination of both said indicating means and of said rear turn indicating means alone, said front turn indicating means comprising one blinker on each side of the vehicle and said rear indicating means comprising two blinkers on one side of the vehicle and one blinker on the other side of the vehicle, said control means selectively coupling said voltage source to one of the two rear blinkers on said one side of the vehicle, to the remainder of the blinkers on said one side of the vehicle, and to the blinkers on the other side of the vehicle.

2. Indicator apparatus for a vehicle comprising a voltage source, left and right front turn indicating means, left and right rear turn indicating means, and control means for selectively coupling said voltage source to said left turn indicating means and to said right turn indicating means respectively, said control means being further adapted for connecting said voltage source to one of said rear turn indicating means independently of all of the other said turn indicating means.

References Cited in the file of this patent

UNITED STATES PATENTS

| | | |
|---|---|---|
| 1,353,788 | Safely | Sept. 21, 1920 |
| 2,172,068 | Murray | Sept. 5, 1939 |
| 2,854,649 | Bosher | Sept. 30, 1958 |

UNITED STATES PATENT OFFICE
CERTIFICATE OF CORRECTION

Patent No. 3,014,201                 December 19, 1961

Viktor Himmelbauer

It is hereby certified that error appears in the above numbered patent requiring correction and that the said Letters Patent should read as corrected below.

In the drawing, the reference symbol 15 should appear as indicating the battery located in the central portion of the single drawing.

Signed and sealed this 5th day of June 1962.

(SEAL)
Attest:

ERNEST W. SWIDER
Attesting Officer

DAVID L. LADD
Commissioner of Patents